United States Patent [19]
Vesley et al.

[11] 3,758,562
[45] Sept. 11, 1973

[54] HYDROXYLATION OF AROMATIC ACIDS

[75] Inventors: Jerome A. Vesley, Park Ridge; George L. Hervert, Woodstock, both of Ill.

[73] Assignee: Universal Oil Products Company, Des Plaines, Ill.

[22] Filed: Sept. 29, 1969

[21] Appl. No.: 862,006

[52] U.S. Cl. ............................ 260/520, 260/521 R
[51] Int. Cl. ................................................. C07c 65/02
[58] Field of Search .................... 260/515 R, 479 R, 260/521 R, 520

[56] References Cited
UNITED STATES PATENTS
3,453,332  7/1969  Vesely et al. .................. 260/613 R OTHER PUBLICATIONS
Universal Oil Products Co., Chem. Abst. 68 68700n (1968)

*Primary Examiner*—Lorraine A. Weinberger
*Assistant Examiner*—John F. Teropane
*Attorney*—James R. Hoatson, Jr. and Raymond H. Nelson

[57] ABSTRACT

The nuclear hydroxylation of a nuclearly substituted aromatic acid is accomplished by treating the acid with hydrogen perioxide in the presence of a catalyst comprising a hydrogen fluoride-carbon dioxide complex at a temperature in the range of from about $-10°$ to about $100°C.$ and a pressure in the range of from about ambient to about 100 atmospheres.

8 Claims, No Drawings

HYDROXYLATION OF AROMATIC ACIDS

This invention relates to a process for the hydroxylation of aromatic acids. More particularly, the invention is concerned with a process for the nuclear hydroxylation of a substituted aromatic acid whereby one or more hydroxyl groups are introduced on the aromatic nucleus of the acid.

Hydroxylated aromatic acids are finding a wide variety of uses in the chemical field. For example, α-resorcylic acid which is 3,5-dihydroxybenzoic acid is used as an intermediate for dyes, for pharmaceuticals, and for light stabilizers and resins; β-resorcylic acid which is 2,4-dihydroxybenzoic acid is also used as a dyestuff, as an intermediate in the preparation of pharmaceuticals or in the synthesis of fine organic chemicals. A third isomer of the dihydroxybenzoic acid which is gentisic acid (2,5-dihydroxybenzoic acid) is used in medicine as sodium gentisate. Another hydroxylated aromatic acid is gallic acid (3,4,5-trihydroxybenzoic acid) which is used for a variety of purposes including its use in photography, writing ink, dyeing, in the manufacture of pyrogallol which itself has many uses, as a tanning agent and in the manufacture of tannins, in paper manufacture, in synthesis of pharmaceuticals, in process engraving and lithography, etc.

It is therefore an object of this invention to provide a process for preparing hydroxylated aromatic acids. A further object of this invention is to provide a process for introducing hydroxyl substituents on the nucleus of a substituted aromatic acid to provide useful chemical compounds.

In one aspect an embodiment of this invention resides in a process for the nuclear hydroxylation of an aromatic acid which possesses the generic formula

in which R is independently selected from the group consisting of hydrogen, alkyl, cycloalkyl, aryl, aralkyl, alkaryl, hydroxy, alkoxy and acyloxy radicals, Ar is an aromatic hydrocarbon nucleus, $n$ is an integer of from 1 to 3 and $m$ is an integer of from 0 to about 10, at least one R being other than hydrogen when $m$ is 0, which comprises treating said aromatic acid with hydrogen peroxide at a temperature in the range of from about $-10°$ to about $100°C$. and a pressure in the range of from about ambient to about 100 atmospheres in the presence of a catalyst comprising a hydrogen fluoride-carbon dioxide complex, and recovering the resultant hydroxylated aromatic acid.

A further embodiment of this invention is found in a process for the nuclear hydroxylation of an aromatic acid which comprises treating said acid with an aqueous solution of hydrogen peroxide containing from 5 to about 90 percent of hydrogen peroxide at a temperature in the range of from about $-10°$ to about $100°C$. and at a pressure in the range of from about ambient to about 100 atmospheres in the presence of a catalyst comprising a hydrogen fluoride-carbon dioxide complex, and recovering the resultant hydroxylated aromatic acid.

A specific embodiment of this invention is found in a process for the nuclear hydroxylation of salicylic acid which comprises treating said acid with an aqueous solution of hydrogen peroxide containing from about 5 to about 90 percent hydrogen peroxide at a temperature in the range of from about $0°$ to about $40°C$. and at a pressure in the range of from about ambient to about 100 atmospheres in the presence of a hydrogen fluoride-carbon dioxide complex in which the concentration of hydrogen fluoride in said complex is greater than 60 percent by weight and the concentration of carbon dioxide is at least 15 percent by weight, and recovering the resultant dihydroxybenzoic acids.

Other objects and embodiments will be found in the following further detailed description of the present invention.

As hereinbefore set forth the present invention is concerned with a process for introducing one or more hydroxyl substituents on the nucleus or ring of an aromatic acid, said hydroxylation being effected by treating a substituted aromatic acid with hydrogen peroxide in the presence of a catalyst comprising a hydrogen fluoride-carbon dioxide complex at hydroxylation conditions. While it is known that certain aromatic compounds can be hydroxylated utilizing hydrogen peroxide in the presence of hydrogen fluoride, we have found that it is impossible to hydroxylate benzoic acid in this manner. However, it has now been discovered that when an aromatic acid contains an activating substituent of the type hereinafter set forth in greater detail, the acid is reactive and may be hydroxylated to yield the desired hydroxylated aromatic acid derivative. The term "aromatic acid" as used in the present specification and appended claims will refer to these acids which contain an activating substituent.

Aromatic acids which comprise suitable starting materials for the process of this invention possess the generic formula

in which R is independently selected from the group consisting of hydrogen, alkyl, cycloalkyl, aryl, alkaryl, aralkyl, hydroxy, alkoxy and acyloxy radicals, Ar is an aromatic hydrocarbon nucleus, n is an integer of from 1 to 3 and $m$ is an integer of from 0 to about 10, at least one R being other than hydrogen when $m$ is 0. It is contemplated that compounds in which R may comprise another carboxy group, a halogen atom or a nitro group may also be utilized provided that a second R in the molecule comprises an alkyl, hydroxy, alkoxy or acyloxy substituent, but not necessarily with equivalent results. The aromatic hydrocarbon nucleus of the formula which is designated Ar may comprise a benzene, naphthalene, anthracene, phenanthrene, chrysene, pyrene or biphenyl nucleus. Some specific examples of these acids which will undergo nuclear hydroxylation will include o-toluic acid, m-toluic acid, p-toluic acid, o-ethylbenzoic acid, m-ethylbenzoic acid, p-ethylbenzoic acid, o-propylbenzoic acid, m-propylbenzoic acid, p-propylbenzoic acid, o-isopropylbenzoic acid, m-isopropylbenzoic acid, p-isopropylbenzoic acid, o-t-butyl-benzoic acid, m-t-butylbenzoic acid, p-t-butylbenzoic acid, 2,4-dimethylbenzoic acid, 2,5-dimethylbenzoic acid, 2,6-dimethyl-benzoic acid, 2,4-diethylbenzoic acid, 2,5-diethylbenzoic acid, 2,6-diethylbenzoic acid, 2,4-dipropylbenzoic acid, 2,5-dipropylbenzoic acid, 2,6-dipropylbenzoic acid, 2,4-diisopropylbenzoic acid, 2,5-diisopropylbenzoic acid, 2,6-diisopropylbenzoic acid, 2,4,6-trimethylbenzoic acid, o-cyclohexylbenzoic acid, m-cyclohexylbenzoic acid, p-cyclohexylbenzoic acid, o-phenylbenzoic acid, m-phenylbenzoic acid, p-phenylbenzoic acid, o-benzylbenzoic acid, m-benzylbenzoic acid, p-benzylbenzoic acid, o-p- tolylbenzoic acid, m-p-tolylbenzoic acid, p-p-tolylbenzoic acid, salicylic acid, 4-methylsalicylic acid, 4-ethylsalicylic acid, 2,4-dihydroxybenzoic acid, o-methoxybenzoic acid, m-methoxybenzoic acid, p-methoxybenzoic acid, o-ethoxybenzoic acid, m-ethoxybenzoic acid, p-ethoxybenzoic acid, phenylacetic acid, p-methylphenylacetic acid, p-ethylphenylacetic acid, o-hydroxyphenylacetic acid, m-hydroxyphenylacetic acid, p-hydroxyphenylacetic acid, o-methoxyphenylacetic acid, m-methoxyphenylacetic acid, p-methoxyphenylacetic acid, o-ethoxyphenylacetic acid, m-ethoxyphenylacetic acid, p-ethoxyphenylacetic acid, 2-phenylpropionic acid, 3-phenylpropionic acid, 2-(o-methylphenyl)propionic acid, 2-(m-methylphenyl)propionic acid, 2-(p-methylphenyl)propionic acid, 2-(o-hydroxyphenyl)propionic acid, 2-(m-hydroxyphenyl) propionic acid, 2-(p-hydroxyphenyl)propionic acid, 3-(o-methylphenyl)propionic acid, 3-(m-methylphenyl)propionic acid, 3-(p-methylphenyl)propionic acid, 3-(o-hydroxyphenyl)propionic acid, 3-(m-hydroxyphenyl)propionic acid, 3-(p-hydroxyphenyl)propionic acid, 2-phenylbutyric acid, 3-phenylbutyric acid, 4-phenylbutyric acid, 2-(o-hydroxyphenyl)butyric acid, 2-(m-hydroxyphenyl)butyric acid, 2-(p-hydroxyphenyl)butyric acid, 3-(o-hydroxyphenyl)butyric acid, 3-(m-hydroxyphenyl)butyric acid, 3-(p-hydroxyphenyl)butyric acid, 4-(o-hydroxyphenyl)butyric acid, 4-(m-hydroxyphenyl)butyric acid, 4-(p-hydroxyphenyl)butyric acid, 2-, 3-, 4- or 5-phenylvaleric acids, 2-, 3-, 4-, 5- or 6-phenylhexanoic acids, etc., 1-methyl-2-naphthoic acid, 1-ethyl-2-naphthoic acid, 1-propyl-2-naphthoic acid, 1-hydroxy-2-naphthoic acid, 1-phenyl-2-naphthoic acid, 1-benzyl-2-naphthoic acid, 1-p-tolyl-2-naphthoic acid, 3-methyl-2-naphthoic acid, 3-ethyl-2-naphthoic acid, 3-propyl-2-naphthoic acid, 3-hydroxy-2-naphthoic acid, 3-phenyl-2-naphthoic acid, 3-benzyl-2-naphthoic acid, 3-p-tolyl-2-naphthoic acid, the corresponding carboxylic acids of anthracene, phenanthrene, chrysene, pyrene, etc. It is to be understood that the aforementioned aromatic acids containing a reactive substituent are only representative of the class of compounds which may be used, and that the present invention is not necessarily limited thereto.

As hereinbefore set forth, it has now been discovered that the desired hydroxylated aromatic acids may be obtained by treating an aromatic acid of the type hereinbefore set forth in greater detail with hydrogen peroxide in the presence of a catalyst comprising a hydrogen fluoride-carbon dioxide complex. By utilizing this particular catalyst complex in the hydroxylation of aromatic acids which contain a substituent on the aromatic nucleus such as an alkyl, alkoxy, hydroxy, etc., radical, it is possible to shorten the addition time of the hydrogen peroxide as well as being able to utilize a lesser amount of the catalyst complex, that is, a lower inventory of hydrogen fluoride will be required to effect a maximum conversion of the feed stock to the desired hydroxylated derivatives. This, in turn, will permit the reaction to be carried out at a decreased cost with a correspondingly more attractive return on the initial investment of the apparatus required to effect the reaction.

It is also contemplated within the scope of this invention that the hydroxylation of the aromatic acids may also be effected utilizing carbon dioxide as a complex with other catalysts such as boron trifluoride or Friedel-Crafts metal halides such as aluminum chloride, ferric chloride, zinc chloride, etc.; and other hydroxylation agents including peroxides such as t-butyl peroxides, propyl peroxide, propyl hydroperoxide, etc., or peracids such as performic acid, peracetic acid, perpropionic acid, perbutyric acid, monoperphthalic acid, trifluoroperacetic acid, etc., although not necessarily with equivalent results.

The process of this invention is effected by treating an aromatic acid of the type hereinbefore set forth in greater detail with hydrogen peroxide in the presence of a catalyst comprising a hydrogen fluoride-carbon dioxide complex at hydroxylation conditions. The hydrogen peroxide may be present in an aqueous solution containing from 5 up to 90 percent or more hydrogen peroxide. The preferred hydrogen peroxide solution will contain a 30-50 percent or higher concentration of hydrogen peroxide inasmuch as when utilizing a lesser amount, the aqueous portion of the solution will tend to dilute the catalyst which is preferably charged to the reaction zone in anhydrous form. When the concentration of the hydrogen fluoride in the catalyst complex falls below a figure of about 60 to 70 percent, the reaction will slow down and eventually cease. Therefore, it is necessary to maintain the concentration of hydrogen fluoride in an amount greater than 60 percent and preferably greater than 80 percent and thus necessitate the use of a relatively concentrated hydrogen peroxide solution. It is also contempated, if so desired, that an additional compound such as boron trifluoride or a ferrous fluoborate having the formula $FeF_2 \cdot BF_3$ may be utilized as a promoter to increase the catalytic acidity and thereby permit the reaction to proceed in such a manner as to provide increased yields of the desired product. In addition, the reaction is effected under hydroxylation conditions which will include temperatures ranging from about −10° up to about 100°C. or more and preferably at a temperature in the range of from about 0° to about 40°C. The reaction pressures which are utilized will range from ambient up to about 100 atmospheres, the superatmospheric pressures being effected by the introduction of the carbon dioxide into the reaction vessel. It is contemplated that the carbon dioxide will be present in the reaction mixture in an amount in the range of from about 15 to about 50 weight percent of the catalyst phase. The amount of carbon dioxide which is present in the reaction mixture will depend, in certain instances, upon the product distribution of the various isomers which may be desired.

The obtention of either a monohydroxylated aromatic acid or polyhydroxylated aromatic acid can be varied according to the amount of aromatic acid which is treated with the hydrogen peroxide. For example, if a monohydroxylated aromatic acid is desired, an excess of the starting aromatic acid will be used. Conversely, if a polyhydroxylated aromatic acid comprises the desired product, the relative amount of hydrogen peroxide which is used will be increased. Generally speaking, the aromatic acid will be present in a mole ratio in the range of from about 3:1 to about 15:1 moles of aromatic acid per mole of hydrogen peroxide, although greater or lesser amounts of aromatic acids may also be used.

The process of this invention may be effected in any suitable manner and may comprise either a continuous or batch type operation. For example, when a batch type operation is used, a quantity of the aromatic acid to be hydroxylated is pressed in an appropriate apparatus such as, for example, a stirred or rotating autoclave, along with the hydrogen fluoride. The autoclave is then heated or cooled to the desired temperature and maintained thereat during the reaction period which may vary from about 0.5 hour up to about 5 hours or more in duration. The carbon dioxide is pressed in until the desired weight percent of the catalyst complex has been reached. Following this, the hydrogen peroxide is added thereto under controlled conditions and the reaction is allowed to proceed for the predetermined residence time. By utilizing the carbon dioxide as a component of the catalyst system in the reaction, it has also been discovered that another advantage is present in that said carbon dioxide will act as an internal coolant thereby allowing the hydrogen peroxide to be added during a shorter period without having the corresponding sharp and contained rise in the reaction temperature occur. Upon completion of the desired residence time, the excess pressure is vented and the catalyst is purged from the reactor utilizing a stream of inert gas such as nitrogen as the purging agent. The reaction mixture is recovered from the reactor and subjected to conventional means for recovery of the desired product, said means including washing the mixture with an inert organic solvent, neutralizing any hydrogen fluoride which may still be present, flashing off the solvent and subjecting the reaction mixture to fractional distillation or recrystallization to recover the desired acid.

It is also contemplated within the scope of this invention that the process described herein may be effected in a continuous manner of operation. When such a type of operation is used, the aromatic acid is continuously charged to a reaction zone which is maintained at the proper operating conditions of temperature and pressure, said reaction zone also containing the hydrogen fluoride-carbon dioxide catalyst complex. In addition, the hydrogen peroxide in the form of an aqueous solution containing from 5 up to about 90 percent or more hydrogen peroxide is continuously charged to the reaction zone. As hereinbefore set forth, carbon dioxide will be present in the reaction zone in an amount ranging from about 15 to about 50 percent by weight of the catalyst complex thereby permitting the addition of the hydrogen peroxide to be effected in a shorter period of time without a corresponding increase in the reaction temperature. If so desired, the hydrogen fluoride-carbon dioxide complex may also be continuously charged to the reaction zone and the reaction allowed to proceed for a predetermined period of time following which the reactor effluent is continuously withdrawn. The reactor effluent is continuously withdrawn from the reactor and subjected to treatment similar to that hereinbefore set forth to recover the desired hydroxylated aromatic acids.

Examples of hydroxylated aromatic acids which may be prepared according to the process of this invention include 5-hydroxy-o-toluic acid, 3,5-dihydroxy-o-toluic acid, 5-hydroxy-m-toluic acid, 5-hydroxy-p-toluic acid, 3,5-dihydroxy-p-toluic acid, 5-hydroxy-2-ethylbenzoic acid, 5-hydroxy-3-ethylbenzoic acid, 3-hydroxy-4-ethylbenzoic acid, 3,5-dihydroxy-4-ethylbenzoic acid, 5-hydroxy-2-propylbenzoic acid, 5-hydroxy-3-propylbenzoic acid, 3-hydroxy-4-propylbenzoic acid, 3,5-dihydroxy-4-propylbenzoic acid, 5-hydroxy-2-isopropylbenzoic acid, 5-hydroxy-3-isopropylbenzoic acid, 3-hydroxy-4-isopropylbenzoic acid, 3,5-dihydroxy-4-isopropylbenzoic acid, 5-hydroxy-o-t-butylbenzoic acid, 5-hydroxy-3-t-butylbenzoic acid, 5-hydroxy-4-t-butylbenzoic acid, 3,5-dihydroxy-4-t-butylbenzoic acid, 5-hydroxy-2,4-dimethylbenzoic acid, 3-hydroxy-2,5-dimethylbenzoic acid, 5-hydroxy-2,6-dimethylbenzoic acid, 5-hydroxy-2,4,6-trimethylbenzoic acid, 3,5-dihydroxy-2,4,6-trimethylbenzoic acid, 5-hydroxy-2-cyclohexylbenzoic acid, 5-hydroxy-2-phenylbenzoic acid, 3,5-dihydroxy-4-phenylbenzoic acid, 2,3-dihydroxybenzoic acid, 3,4-dihydroxybenzoic acid, 2,5-dihydroxybenzoic acid, 3,4,5-trihydroxybenzoic acid, 2,3-dihydroxy-4-methylbenzoic acid, 2,5-dihydroxy-4-methylbenzoic acid, 2,3-dihydroxy-4-ethylbenzoic acid, 2,5-dihydroxy-4-ethylbenzoic acid, 5-hydroxy-2-methoxybenzoic acid, 5-hydroxy-3-methoxybenzoic acid, 3,5-dihydroxy-4-methoxybenzoic acid, 5-hydroxy-2-ethoxybenzoic acid, 5-hydroxy-3-ethoxybenzoic acid, 3,5-dihydroxy-4-ethoxybenzoic acid, 3-hydroxyphenylacetic acid, 2,4-dihydroxyphenylacetic acid, 4-hydroxy-3-methylphenylacetic acid, 4-hydroxy-3-ethylphenylacetic acid, 3,4-dihydroxyphenylacetic acid, 2,5-dihydroxyphenylacetic acid, 5-hydroxy-2-methoxyphenylacetic acid, 4-hydroxy-3-methoxyphenylacetic acid, 2,5-dihydroxy-4-methoxyphenylacetic acid, 2-(4-hydroxyphenyl) propionic acid, 2-(2,4-dihydroxyphenyl)propionic acid, 3-(4-hydroxyphenyl)propionic acid, 3-(2,4-dihydroxyphenyl)propionic acid, 2-(4-hydroxy-3-methylphenyl)propionic acid, 3-(2-hydroxyphenyl)propionic acid, 3-(2,5-dihydroxyphenyl)propionic acid, 2-(4-hydroxyphenyl)butyric acid, 3-(4-hydroxyphenyl)butyric acid, 4-(4-hydroxyphenyl)butyric acid, 4-hydroxy-1-methyl-2-naphthoic acid, 3,4-dihydroxy-1-methyl-2-naphthoic acid, 1,4-dihydroxy-2-naphthoic acid, 3,4-dihydroxy-1-naphthoic acid, etc. It is to be understood that the aforementioned compounds are only representative of the class of hydroxylated aromatic acids which may be prepared, and that the process of the present invention as described herein is not necessarily limited thereto.

The following examples are given to illustrate the process of the present invention which, however, are not intended to limit the generally broad scope of the present invention in strict accordance therewith.

EXAMPLE I

In this example 136 g. (1.0 mole) of phenylacetic acid was placed in a stainless steel turbomixer autoclave. Following this 221 g. (11.1 moles) of hydrogen fluoride was charged thereto. Carbon dioxide in an amount of 119 g. which corresponded to 35 weight percent of the catalyst phase was added and thereafter 10.9 of a 30 percent hydrogen peroxide solution was gradually added to the reactor during a period of 10 minutes, said reactor being maintained at a temperature ranging from about 0° to 6°C. by means of an ice bath. The mole ratio of phenylacetic acid to hydrogen peroxide was 10:1. The resulting mixture was stirred for an additional period of 10 minutes while maintaining the temperature of the autoclave in the aforementioned range. After a total contact time of 20 minutes had passed, the excess pressure was vented and the hydrogen fluoride was swept out of the autoclave with a stream of nitrogen for a period of about 2 hours before the autoclave was opened.

The reaction product which comprised 135 g. was transferred to a beaker and the reactor parts were washed with benzene, the washings being added to the reaction product. The solution was decanted into another beaker thereby separating out a small amount of an aqueous acid phase which contained some benzene insoluble product. The decanted benzene solution was treated with calcium carbonate to remove residual hydrogen fluoride, filtered under suction and distilled to remove benzene and unreacted phenylacetic acid. The benzene insoluble product was combined with the product in the aqueous acid phase and extracted with ether. The extract was also treated to remove residual hydrogen fluoride and subjected to distillation to remove the ether. The bottoms from both product segments were combined and subjected to fractional distillation under reduced pressure. The crystalline product which was recovered was found by Nuclear Magnetic Resonance and Infrared Analysis to be hydroxyphenylacetic acid isomers.

EXAMPLE II

In this example 134 g. (0.98 moles) of o-toluic acid along with 250 cc. of n-pentane as a diluent were placed in the glass liner of a stainless steel turbomixer autoclave. Following this 215 g. (10.8 mole) of hydrogen fluoride was charged to the reactor and 92 g. of carbon dioxide corresponding to a 30 weight percent of the catalyst phase were also added. The autoclave was cooled to a temperature of about 0°C. by means of an ice bath following which 16.4 g. (0.14 mole) of a 30 percent hydrogen peroxide solution was slowly added during a period of 28 minutes, the mole ratio of o-toluic acid to hydrogen peroxide being 7.0:1. During the addition period and for a subsequent 17 minute additional stirring time, the temperature of the autoclave was maintained in a range of from 0° to 3°C. Upon completion of the predetermined 45 minute total contact time the excess pressure was vented and the hydrogen fluoride was swept out of the autoclave by means of a stream of nitrogen passing thereto for a period of 2 hours.

After opening the autoclave the 134.1 g. of product was transferred to a beaker and the reactor parts were washed with benzene, the washings being added to the reaction product. Upon decanting the reaction product into a second beaker a small amount of an aqueous acid phase which contains some benzene insoluble product was separated out. The decanted benzene solution was treated to remove residual hydrogen fluoride, filtered under suction and subjected to distillation to remove the benzene and unreacted o-toluic acid. The benzene insoluble product was combined with the product in the aqueous acid phase and extracted with ether. The ether extract was also treated to remove hydrogen fluoride and distilled to remove the ether. The combined products were subjected to fractional distillation whereby the desired 5-hydroxy-o-toluic acid in a yield of 36 mole percent (38.4 g.) was recovered.

EXAMPLE III

To a 1 liter stainless steel turbomixer autoclave is charged 207 g. (1.5 mole) of salicylic acid along with 250 cc. of an n-heptane solvent. Thereafter 244 g. (12.2 moles) of hydrogen fluoride and 119 g. of carbon dioxide are also charged thereto. The autoclave is cooled to a temperature of about 0°C. by means of an ice bath following which 51 g. (0.15 mole) of a 30 percent aqueous hydrogen peroxide solution is gradually added during a period of 10 minutes. The resulting solution is stirred for an additional period of 10 minutes while maintaining the reactor in the temperature range hereinbefore set forth. At the end of this time the excess pressure is vented and the hydrogen fluoride is swept out of the autoclave by means of a stream of nitrogen for a period of 2 hours.

After opening the autoclave the reaction product is treated in a manner similar to that set forth in the above examples. Upon distillation of the combined product segments there is recovered a mixture of dihydroxybenzoic acids which are found to include 2,3-dihydroxybenzoic acid and 2,5-dihydroxybenzoic acid, these two isomers being a major portion of the yield with a small amount of 2,4-dihydroxybenzoic acid and 2,6-dihydroxy-benzoic acid also being present.

EXAMPLE IV

In this experiment 186 g. (1.0 mole) of 1-methyl-2-naphthoic acid along with 250 cc. of n-pentane are charged to a turbomixer autoclave. Following this 215 g. (10.8 mole) of hydrogen fluoride and 92 g. of carbon dioxide are charged to the autoclave. Thereafter 16.4 g. of a 30 percent hydrogen peroxide solution is slowly added to the mixture during a period of about 30 minutes. During the 30 minute addition period and for an additional stirring time of 15 minutes, the temperature of the autoclave and contents thereof is maintained in a range of from about 0° to about 3°C. by means of an ice bath. At the end of the 45 minute total contact period the hydrogen peroxide is purged from the autoclave by means of a stream of nitrogen. The reaction mixture, after opening the autoclave is transferred to a beaker, the autoclave is washed with benzene and the benzene washings are added to the mixture. Upon decanting the solution into another beaker an aqueous acid phase which contains some benzene insoluble product will separate out. The benzene solution is treated to remove residual hydrogen fluoride, filtered under suction and subjected to fractional distillation to remove the benzene and unreacted 1-methyl-2-naphthoic acid. The benzene insoluble product which remains in the reactor is combined with the product in the aqueous acid phase and extracted with ether. This extracted product is also treated to remove residual hydrogen fluoride and distilled to remove the ether. The remainder is combined with the other product segment and subjected to fractional distillation under reduced pressure to recover the desired 4-hydroxy-1-methyl-2-naphthoic acid.

EXAMPLE V

To a turbomixer autoclave is charged 152 g. (1.0 mole) of 4-methoxybenzoic acid along with 250 cc. of a diluent comprising n-pentane. Following this 148 g. (7.4 mole) of hydrogen fluoride and 92 g. of carbon dioxide are charged to the autoclave. The autoclave is immersed in an ice bath and maintained at a temperature in the range of from about 0° to about 5°. Thereafter 21.8 g. of a 30 percent hydrogen peroxide solution is slowly added to the autoclave during a period of about 10 minutes. Following the addition of the hydrogen peroxide the resulting mixture is stirred for an additional period of 10 minutes and thereafter the hydrogen fluoride is purged from the reactor by passing a stream of nitrogen through said reactor for a period of 2 hours.

The autoclave is opened and the reaction product is recovered and poured into a beaker. After washing the autoclave with benzene the washings are combined with the reaction product. Upon decanting the reaction product into a second beaker a small amount of a benzene insoluble product in an aqueous acid phase will separate out. The decanted benzene solution is treated to remove residual hydrogen fluoride, filtered under suction and distilled to remove benzene and unreacted 4-methoxybenzoic acid. The benzene insoluble product is combined with the product in the aqueous acid phase and extracted with ether. The extract is treated to remove residual hydrogen fluoride and distilled to remove the ether. The bottoms from both product segments are combined and subjected to fractional distillation under reduced pressure whereby the desired product comprising a mixture of hydroxymethoxybenzoic acids is recovered. The 3-hydroxy-4-methoxybenzoic acid is the predominating isomer.

EXAMPLE VI

When hydrogen peroxide was added to a stirred mixture of benzoic acid and a catalyst comprising a hydrogen fluoridecarbon dioxide complex in a manner similar to that hereinbefore described, while maintaining the temperature of the reaction at about 25°C., no conversion of the benzoic acid to hydroxybenzoic acid or dihydroxybenzoic acid was found.

We claim as our invention:

1. A process for the nuclear hydroxylation of an aromatic acid which possesses the generic formula $$R_nAr(CR_2)_mCOOH$$

in which R is independently selected from the group consisting of alkyl, cycloalkyl, aryl, aralkyl, alkaryl, hydroxy and alkoxy radicals, Ar is an aromatic hydrocarbon nucleus, $n$ is an integer of from 0 to 3 and $m$ is an integer of from 0 to about 10, at least one R being other than hydrogen when $m$ is 0, and $n$ is 0 only when $m$ is at least 1 which comprises treating said aromatic acid with an aqueous solution containing from about 5 to about 90 percent hydrogen peroxide at a temperature in the range of from about −10° to about 100° C. and a pressure in the range of from about ambient to about 100 atmospheres in the presence of a catalyst comprising a hydrogen fluoride-carbon dioxide complex, in which the concentration of hydrogen fluoride in said catalyst complex is greater than 60 percent by weight and the concentration of carbon dioxide is least 15 percent by weight, and recovering the resultant hydroxylated aromatic acid.

2. The process as set forth in claim 1 in which said aromatic acid is an hydroxy-substituted aromatic acid.

3. The process as set forth in claim 1 in which said aromatic acid is an alkyl-substituted aromatic acid.

4. The process as set forth in claim 1 in which said aromatic acid is salicylic acid and said hydroxylated aromatic acid is a dihydroxybenzoic acid.

5. The process as set forth in claim 1 in which said aromatic acid is o-toluic acid and said hydroxylated aromatic acid is a 5-hydroxy-o-toluic acid.

6. The process as set forth in claim 1 in which said aromatic acid is phenylacetic acid and said hydroxylated aromatic acid is a hydroxyphenylacetic acid.

7. The process as set forth in claim 1 in which said aromatic acid is 1-methyl-2-naphthoic acid and said hydroxylated aromatic acid is 4-hydroxy-1-methyl-2-naphthoic acid.

8. The process as set forth in claim 1 in which said aromatic acid is 4-methoxybenzoic acid and said hydroxylated aromatic acid is a hydroxymethoxybenzoic acid.

* * * * *